US005773035A

United States Patent [19]
Stall et al.

[11] Patent Number: 5,773,035
[45] Date of Patent: Jun. 30, 1998

[54] TUBULAR CELLULOSIC CASING DIE

[75] Inventors: Alan David Stall, Naperville; Algis S. Lewkow, Tinley Park, both of Ill.

[73] Assignee: Alfacel s.a., Madrid, Spain

[21] Appl. No.: 674,150

[22] Filed: Jul. 1, 1996

[51] Int. Cl.[6] .................................................. B29C 47/22
[52] U.S. Cl. ......................... 425/67; 264/187; 264/209.1; 425/381; 425/466
[58] Field of Search ............................ 425/67, 381, 466; 264/187, 209.1, 183

[56] References Cited

U.S. PATENT DOCUMENTS

| | | |
|---|---|---|
| 1,036,282 | 8/1912 | Lilienfeld . |
| 1,070,776 | 8/1913 | Cohoe et al. . |
| 1,158,400 | 10/1915 | Cohoe . |
| 1,163,740 | 12/1915 | Cohoe . |
| 1,601,686 | 9/1926 | Henderson . |
| 1,612,508 | 12/1926 | Henderson et al. . |
| 1,645,050 | 10/1927 | Henderson . |
| 1,654,253 | 12/1927 | Henderson . |
| 1,873,685 | 8/1932 | Voss et al. . |
| 1,898,400 | 2/1933 | Schnecko et al. . |
| 1,937,225 | 11/1933 | Hewitt . |
| 1,942,990 | 1/1934 | Voss . |
| 1,997,349 | 4/1935 | Schwalbe et al. . |
| 2,032,171 | 2/1936 | Hewitt . |
| 2,043,172 | 6/1936 | Hewitt . |
| 2,043,455 | 6/1936 | Voss et al. . |
| 2,141,776 | 12/1938 | Vautier et al. . |
| 2,271,932 | 2/1942 | Atkinson . |
| 2,949,371 | 8/1960 | Freund, II et al. . |
| 2,999,756 | 9/1961 | Shiner et al. . |
| 2,999,757 | 9/1961 | Shiner et al. . |
| 3,835,113 | 9/1974 | Burke et al. . |
| 4,590,107 | 5/1986 | Bridgeford . |
| 4,778,639 | 10/1988 | Jon et al. . |
| 5,277,857 | 1/1994 | Nicholson et al. . |
| 5,284,434 | 2/1994 | Throne et al. ........................... 425/380 |
| 5,358,765 | 10/1994 | Markulin . |
| 5,542,834 | 8/1996 | Lupke .................................. 425/133.1 |

FOREIGN PATENT DOCUMENTS

| | | |
|---|---|---|
| 1220601 | 12/1983 | U.S.S.R. . |
| 1496744 | 7/1987 | U.S.S.R. . |
| 1692488 | 2/1989 | U.S.S.R. . |

*Primary Examiner*—Jay H. Woo
*Assistant Examiner*—Ivrie A. Schwartz
*Attorney, Agent, or Firm*—Marshall, O'Toole, Gerstein, Murray & Borun

[57] ABSTRACT

A modular tubular cellulosic casing die that includes interchangeable parts, and adjustable die openings having an inner lip that can be centered and vertically adjusted relative to the die's outer lip.

26 Claims, 3 Drawing Sheets

TUBULAR CELLULOSIC CASING DIE

Field of the Invention

This invention relates generally to a new and unique extrusion die for cellulosic casing extruding machines. In particular, the die of the invention provides accurate and high speed extrusion of tubular regenerated cellulosic casing.

Background of the Invention

Tubular cellulosic casing is well-known, and has been widely used for many years by numerous manufacturers. The basic process for manufacturing regenerated cellulosic casing is through the well-known viscose process, which creates a liquefied colloidal dispersion of cellulose fibers in a alkaline liquid carrier as described U.K. Patent 8700. U.S. Pat. No. 1,036,282 to Lilienfield refined the viscose compositions and U.S. Pat. Nos. 1,070,776; 1,158,400; and 1,163,740 to Cohoe and Fox describe use of viscose to manufacture a tubular cellulosic casing. Henderson provides basic technology to manufacture viscose into tubular casings, with regenerating baths in contact with the inner and outer surfaces of the tube: U.S. Pat. No. 1,601,686; 1,612,508; 1,645,050; and 1,654,253.

Very specific details for manufacturing modern-day casings from viscose into regenerated cellulose are shown in U.S. Pat Nos. 2,999,756 and 2,999,757 to Shiner; U.S. Pat. No. 3,835,113 to Burke; U.S. Pat. No. 4,590,107 to Bridgeford; U.S. Pat. No. 4,778,639 to Jon; and U.S. Pat. No. 5,358,765 to Markulin which all describe extruding viscose (sodium cellulose xanthate, sodium hydroxide, water) through an annular die, into a coagulating and regenerating bath, to produce a regenerated cellulosic tubular casing.

A critical aspect in the manufacture of the cellulosic casing is the die (nozzle) itself. The die serves several purposes:

1. It is the element through which the viscose liquid takes a tubular shape prior to being regenerated into a casing. Viscose has a viscosity of 20,000 centipoises to 30,000 centipoises, and does not easily change into a tubular condition, so die geometry is critical.
2. The regenerating bath passes through the die to contact the inner surface wall of the casing.
3. The thickness of the casing wall is set, to a great extent, by the spacing of the die's inner and outer lips.
4. Liquids which are collected from inside the casing run back into the die, to be drained in traps.
5. Gasses run back through the die, and must be collected in a trap.
6. A long tubular extrusion mandrel is supported by the die.

As extrusion speeds increase, the die design becomes more critical. Also, due to the corrosive nature of the regenerating liquid and the viscose, the dies are manufactured from extremely expensive and exotic materials, such as Hastelloy™-C, Monel, Ilium, Carpenter 20 or Titanium. It has been difficult in the past to experiment with dies, since it is costly to make a new die for each condition. Consequently, extrusion linespeeds have been limited to a maximum of 45 meters/minute for numerous reasons, including die design limitations.

In the past, obtaining uniform casing wall thickness was extremely difficult. Devices such as centering rods, shown by Henderson on U.S. Pat. No. 1,601,686, were used to realign the inner core of the extrusion die to reposition it slightly and allow a change in channel volume, thereby changing wall thickness somewhat. However, the centering rods pass through the viscose flow, thereby interrupting the viscose flow, and perhaps interrupting any striped or color patterns which may be applied to the viscose. Henderson shows this same centering rod concept in U.S. Pat. No. 1,645,050, again showing that adjustment of the centering rods repositioning the inner body of the die directly, allowing a change in flow passage size, and a change in extrusion lip opening at the exit of the die.

A simple die is disclosed by Voss, U.S. Pat. No. 1,873,685, using movable cores inside the die to change internal bath characteristics. This type of die is disclosed also by Schnecko, U.S. Pat. No. 1,898,400 and Voss, U.S. Pat. No. 1,942,990.

Hewitt discloses in U.S. Pat. No. 1,937,225, a die where regeneration is slowed down to allow gases generated inside the tubular casing to collect throughout the casing extrusion line, rather than collecting all the gases in the area of the die itself. The goal is to spread out the gas generation over a longer travel path, increasing the length of time before the casing is punctured to release the internal gases. Hewitt's die recognizes the viscous nature of viscose, and has a viscose passageway inclined in the side opposite the viscose entry port, to alleviate spots of insufficient flow, where viscose can congeal and gel.

Schwalbe, in U.S. Pat. No. 1,997,349, discloses a conventional die and gas trap. Hewitt, U.S. Pat. No. 2,032,171, disclosed a detailed extrusion die and gas trap, but without a means to adjust casing wall thickness, relying instead on self-centering parts and concentricity of annular passageways. Hewitt also has a complicated flow passageway for viscose.

Hewitt's U.S. Pat. No. 2,043,172 shows an extrusion die, which again is a solid, fitted die. Voss shows in U.S. Pat. NO. 2,043,455 an extrusion die where the core of the die does not act as a drain, but rather supplies regenerating solution. Vautier shows in U.S. Pat. No. 2,141,776, a tubular cellulosic die without a drain, but only for supplying internal coagulating liquid. Atkinson, U.S. Pat. No. 2,271,932 discloses a die having a perforated plate that holds the mandrel in place, but interrupts the viscose flow in the die.

Nicholson, in U.S. Pat. No. 5,277,857 shows a die for extruding cellulose downward, using a solvent of NMMO for the cellulose, not viscose.

Rozenberg, Russian patent SU 1,692,488, shows a compact die, but with no mechanism to adjust the wall thickness of the product, except for press-fit concentricity which is non-adjustable. Rozenberg, Russia Patent SU 1,496,744, discloses using conical inserts to ensure concentricity of orifice sizes. Rozenberg, Russia Patent SU 1,220,601, shows a very simplified die design, but with no adjustment means.

Viscose solution is difficult to control. Typically, it has a high viscosity, 21,000 centipoises to 25,000 centipoises, and viscosities are increasing due to use of higher cellulose content, higher degree of polymerization of the cellulose, and colder viscose temperature, all of which give higher strength casings. But, as the viscosity increases, it becomes more difficult to maintain extrusion linespeed and especially to maintain uniform wall thickness.

Prior art dies have resulted in day-to-day variation in absolute minimum wall thickness to absolute maximum that can be ±25%. That is, if the target is 25 micron wall thickness, the minimum wall thickness over one week running time could be 19 microns, the maximum could be 31 microns. Even within an individual piece of casing, it is difficult to consistently achieve better than ±10%, so that an individual 25 micron thickness casing would vary in wall thickness from 22.5 microns to 27.5 microns.

Variations in wall thickness of the casing has numerous effects:

1. Extra cellulose must be added to insure the minimum wall thickness is sufficient to avoid premature casing rupture during frankfurter or sausage processing.
2. Orientation of the casing to add residual shrink later in the process is more variable, resulting in less precision in the product.
3. Appearance of shirred sticks, post-processing of reels, can create a rough, rope-looking appearance.
4. Colored or striped casing can exhibit coloration variations.
5. Regeneration of the casing is different, in that thinner casing wall regenerates faster and exhibits higher porosity, and thicker casing wall regenerates slowly and exhibits less porosity. This porosity variation can effect the degree of plasticization by glycerine post-extrusion, and can also cause color variations on the stuffed frankfurter due to variations in penetration rates of smoke into the product during smoking.

It is common in the art of casing extrusions to attempt to control the casing wall thickness more precisely from day-to-day, and within the casing itself. Methods to do this in the prior art were not effective, requiring either changing physical pieces of material to alter geometric shapes, or to adjust flow centering rods to reposition the core of the die, but often resulting in a loss of verticality of the core, and resulting in centering rods interrupting the viscose flow. If the core of the die does not remain perfectly vertical, the mandrel which is attached to it can lose its verticality, and the internal bath flow passageways also lose their concentricity, resulting in non-uniform exiting flow of the bath around the entire circumference of discharge.

The present invention overcomes these deficiencies by providing a die which can easily be centered, allows no interruption of the viscose flow, and is modular in construction to allow easy disassembly and changing of elements should alternative viscose compositions or viscosities alter the Theological demands of the die.

SUMMARY OF THE INVENTION

The die of the present invention has a streamlined viscose channel flow with no internal obstructions to allow high viscosity viscose of 30,000 centipoise or more to flow freely. The internal bath also has a streamlined passage flow through the die, removing areas where sulfur deposits can plug the passageway, and alter the flow. A centering adjuster acts on the external die body to reposition the viscose flow passageway, thereby moving the body to change passage concentricity. The inside bath flow passageways are not affected by the centering adjustment.

The die is entirely modular, and various combinations of cores, bodies, inner lips, and outer lips can be used to change passageway openings easily, thereby allowing exact customization of a die to the individual casing requirements, without remanufacturing numerous die components. Also, the mounting ring, once fixed to the bottom of the aquarium, does not need to be removed for die changes. If the aquarium is drained, the outer lip can be removed and changed, the inner lip, core, and die body can be removed and changed, and the changeover of a die can be done very quickly.

The die is designed to be used with viscose viscosities of about 30,000 centipoise, but because of its modular design, will work with viscose of all viscosities. The casing can be held to a wall thickness variation of ±10%, and in many cases ±5%, consistently.

With the modular components, adverse consequences of corrosion are reduced because the body of the die sees only viscose, ph 12, and can thus be made in 316 Stainless Steel. The inside bath, containing sulfuric acid, with pH 2, requires Hastelloy™-C, but the inside bath never touches the die body, so a more economical die can be made. The carrier flange centering adjusters also can be made of stainless steel, since they do not contact the corrosive bath.

Threaded fittings are kept to a minimum making assembly and disassembly easy, with leak-free joints, and reduced chance of threaded fittings corroding and seizing.

With the ability to handle high viscosity viscose, with uniform wall thickness, an extrusion speed of 60 meters per minute is now readily achievable, without fears of gels, fouling of die lips, non-uniform wall, etc.

One embodiment of the invention includes an adjustable lip opening. By adjusting the lip spacing, the wall thickness can easily be varied, allowing final precision control at the viscose die opening, the most critical place. The lip opening can be adjusted with centering screws or vertical jacking screws or with both. The advantage of varying the lip opening is that it results in very precise die openings. When used in conjunction with centering screws, precision is improved and a very good wall thickness is obtained for critical products.

DETAILED DESCRIPTION OF THE DRAWINGS

Figure 2:
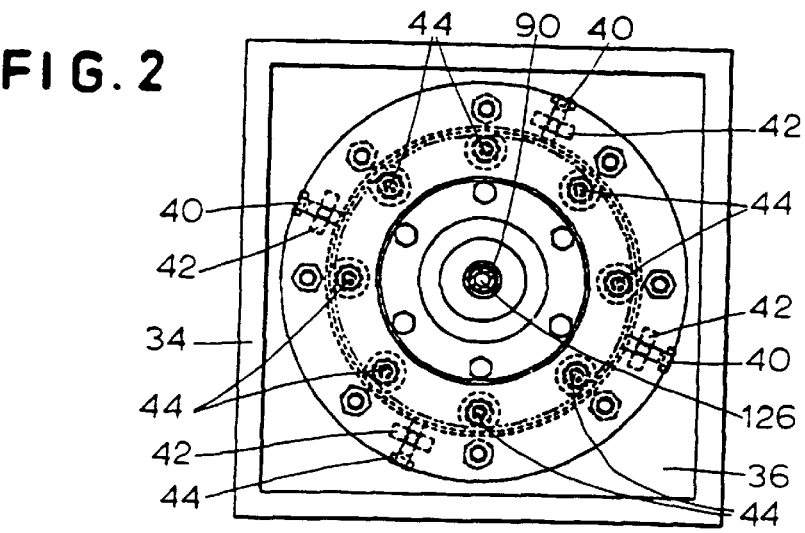
FIG. 2 is a cross-section of the casing die taken along line 2—2 of FIG. 1.

To the extent practical, the same reference numerals will be used for the same or similar items in each of the figures. With respect to FIG. 1, there is depicted a tubular cellulosic casing extruder 20 which, as described in detail below, receives viscose in a highly viscous liquid form, extrudes it into a tubular shape, and regenerates the viscose into a cellulosic tubular casing.

The extruder 20 includes a viscose feed tube 22 that receives viscose from a viscose supply tank (not illustrated) and feeds the viscose to a die body 24 having an internal bore 26. The die body 24 is joined at its top to a carrier flange 30 that in turn is mounted to a mounting ring 32 joined to a lower portion of an aquarium 34. Preferably, the mounting ring 32 is supported by a bottom 36 on the aquarium 34 so that the mounting ring need not be removed when the die is changed. The aquarium 34 contains an outside bath of regenerating fluid 37. An outer lip 38 is also mounted n the carrier flange 30. The outer lip 38, the aquarium 34, the mounting ring 32, and the carrier flange 30 are all joined to the casing extruder 20 in a relatively fixed position.

The die body 24, on the other hand, is preferably joined to the carrier flange 30 in such a manner as to be adjustable in at least one direction relative to the carrier flange 30. A means for adjusting the position of the die body 24 includes at least one centering adjustment screw 40 bearing on the die body 24 and threaded into a centering adjustment screw tab 42 that is fixed to the carrier flange 30. In this manner, rotating the centering adjustment screw 40 in a clockwise direction will adjust the die body 24 to the right. By rotating the centering adjustment screw 40 counterclockwise, the die body 24 can be moved to the left by an opposing centering screw 40 (illustrated in FIG. 2). Preferably, four centering adjustment screws 40, as depicted in FIG. 2, are used in cooperation to adjust the position of the die body 24 relative to the carrier flange 30.

Figure 3:
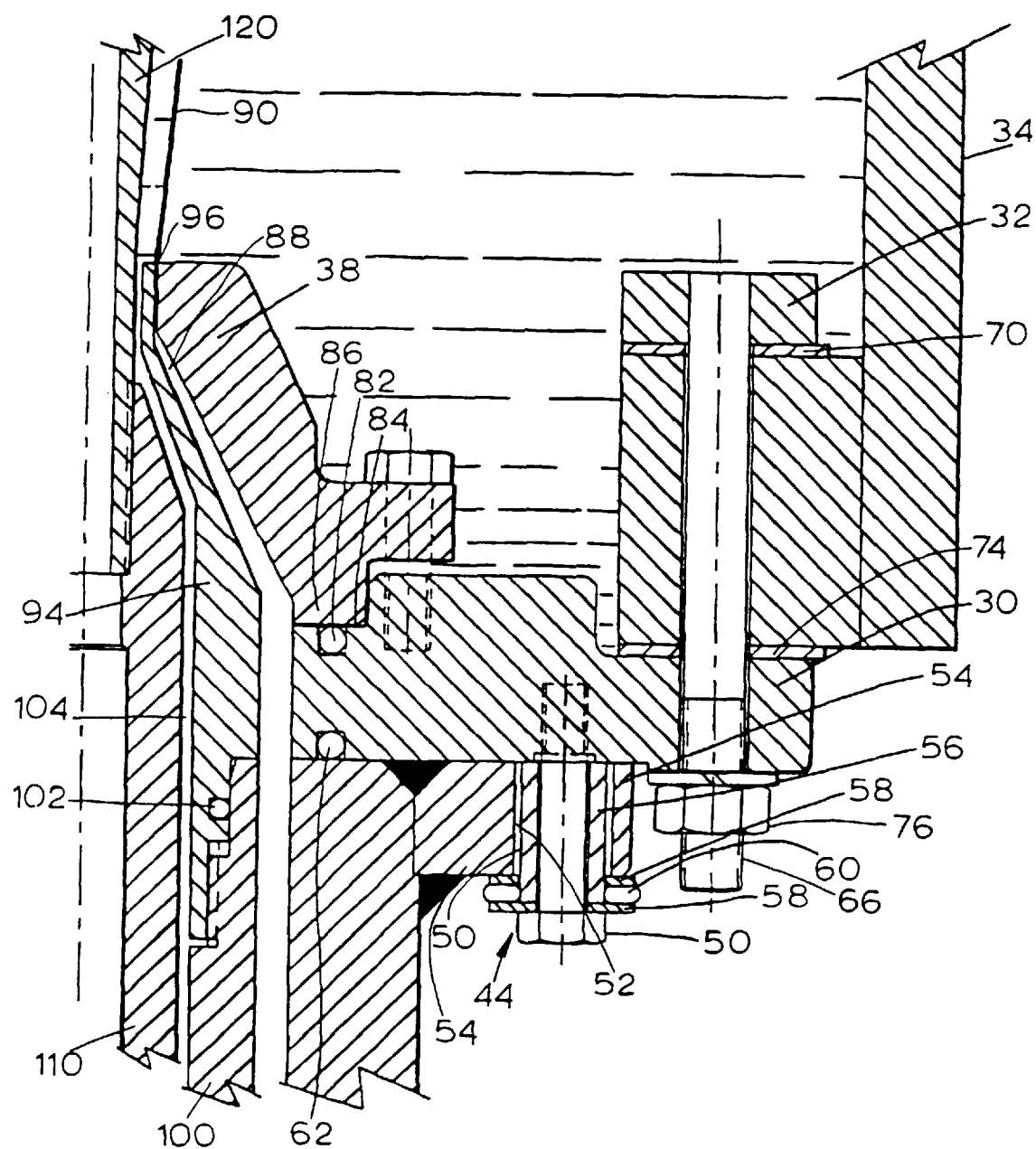
FIG. 3 is a detailed illustration of a spring assembly for use in the present invention.
Figure 5:
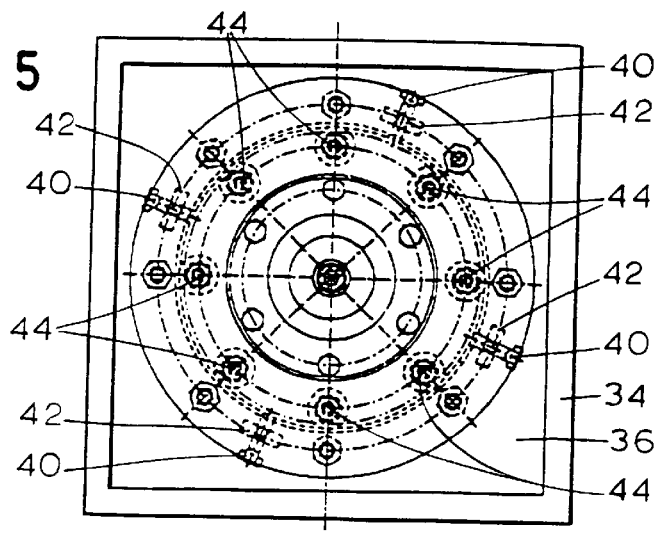
FIG. 5 is a cross-section of the alternate casing die taken along line 5—5 of FIG. 4.

This movement is possible because the die body 24 is joined to the carrier flange 30 using a plurality of spring assemblies 44 which are depicted in detail in FIG. 3. The spring assemblies 44 each include a bolt 50 threaded into the carrier flange 30 and extending through an oversized hole 52 in a die body flange 54. A cylindrical spacer washer 56 is also positioned in the oversized die body flange hole 52 to limit the depth to which the spring assembly bolt 50 can be screwed. Near the head of the spring assembly bolt 50, are a pair of washers 58 which sandwich a spring 60. The spring 60 is preferably an elastomer o-ring that is compressed to apply variable tension to the bolt 50 without unduly applying bearing pressure on the components that are being joined. This combination of elements in the spring assembly 44 provides a snug fit between the die body 24 and the carrier flange 30 while permitting lateral movement of the die body 24 relative to the carrier flange 30 when the centering adjustment screws 40 are operated. To enhance the liquid seal between the die body 24 and the carrier flange 30, a gasket 62 is provided. As can be seen in FIG. 2, eight spring assemblies 44 are preferred, but there can be more or less, as required, to overcome the spring-like bias of the gasket 62.

The centering adjustment design does not enter the viscose flowway. With cold, high viscosity viscose, there is no impediment to the passageway that would allow gels or particles to deposit. Also, if striping layers are added in the die between the viscose feed tube 22 and the carrier flange 30 the stripes will not be blurred.

Also illustrated in FIG. 3, is a detail of the bolt connection between the carrier flange 30 and the mounting ring 32 which has welded thereto an elongate threaded stud 66 bearing down on a gasket 70 and the aquarium bottom 36 which is welded to the lower end of the aquarium 34. Below the aquarium bottom 36 is another gasket 74 which seals the interface between the carrier flange 30 and the aquarium bottom 36. A nut and washer combination 76 completes the connection, as illustrated, and is easily accessible from below.

Figure 1:
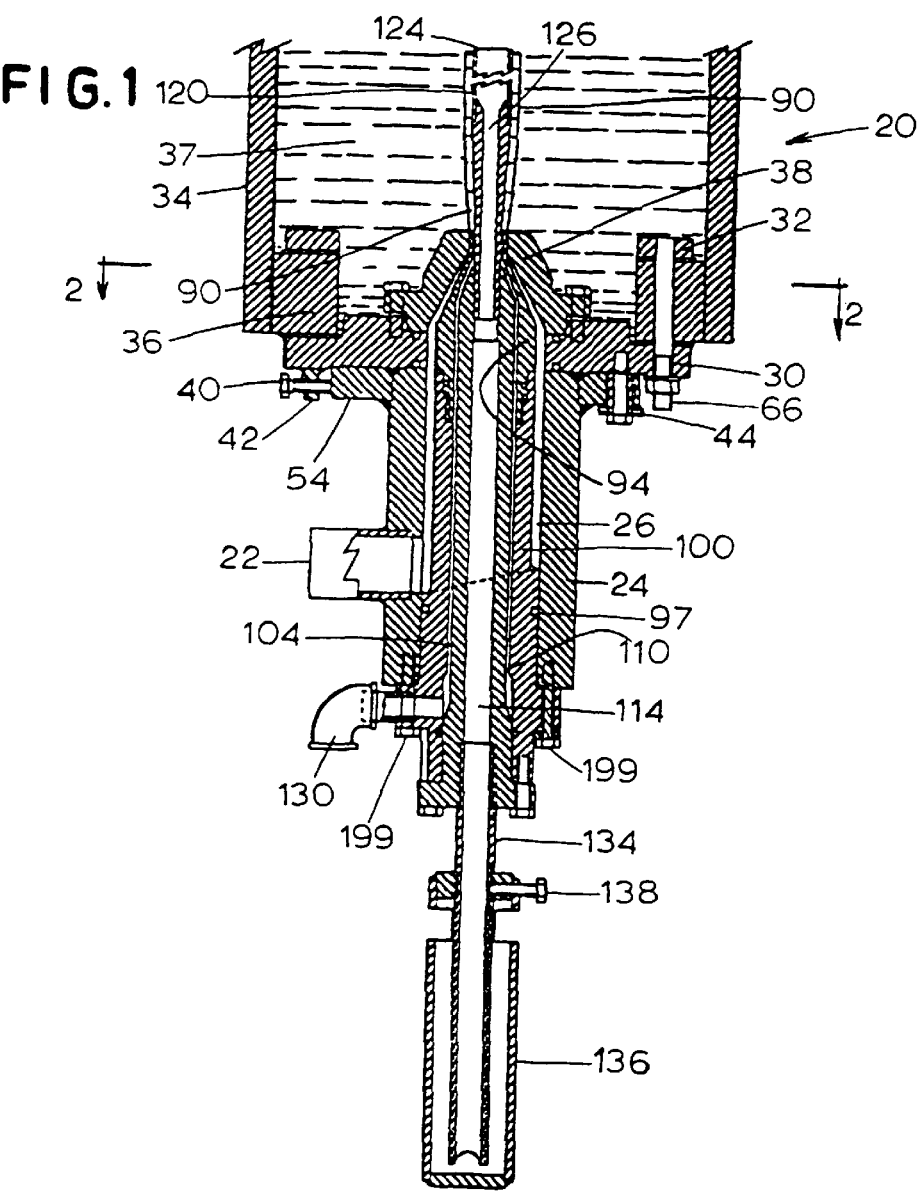
FIG. 1 is a cross-sectional view of tubular cellulosic casing die in accordance with the present invention.

Referring to FIGS. 1 and 3, the outer lip 38 is bolted to the top side of the carrier flange 30. An outer lip gasket 82 seals the interface between the outer lip 38 and the carrier flange 30. The carrier flange 30 is provided with a seat 84 on which a downwardly extending annular rim 86 is securely positioned. The upper end of the outer lip 38 defines a round orifice 88 which itself defines an outer diameter for a cellulosic casing 90 extruded therethrough. The outer lip 38 is shaped somewhat like an inverted funnel to provide a relatively unobstructed flow path for viscose prior to extrusion. As stated above, the outer lip 38 is in a fixed position relative to the extruder 20.

The inside diameter of the cellulosic casing 90 is defined by an interchangeable inner lip 94. The inner lip 94 is adjustable relative to the outer lip 38, in part, because it is joined to the die body 24 that is adjusted as described above. An outer radial surface 40 on the inner lip 94 is spaced in the orifice 88 of the outer lip 38 to define an annular die opening 96 through which viscose is extruded to form the cellulosic casing 90. It is this annular opening 96, that is adjustable using the present invention.

The inner lip 94 extends outward and downward from the die opening 96 in a shape similar to the outer lip 38 to define a tapered annular space through which viscose flows. As illustrated, the inner lip 94 includes a vertical cylinder portion 100 that has an outer diameter slightly smaller than the internal die body bore 26 to define an annular space through which viscose flows. At the lower end of the cylinder 100 there is an expanded portion that fits closely into the internal die body bore 26 to maintain vertical alignment of the cylinder 100 and inner lip 94 with the die body 24. The interface is sealed by a gasket 97 and they are joined together with bolts 199.

As illustrated by the dashed line in FIG. 1, the large diameter portion of the cylinder 100 is machined at an angle ascending from the viscose inlet conduit 22 to the opposite side of the die body 24 to improve the flow characteristics of the viscose in the annular space and avoid eddies where viscose can accumulate.

The inner lip 94 also defines an internal longitudinal bore 104 through which inside bath regenerating fluid flows as described in detail below.

The upper conical portion of the inner lip 94 is preferably threaded into the cylinder 100. The cylinder 100 is bolted to the lower surface of the die body 24 as illustrated and a gasket 102 seals the interface. The threaded connection is optional, but it makes the upper portion of the inner lip 94 interchangeable relative to the cylinder 100 so that a variety of inner lip geometries can be used with a single cylinder 100 to reduce costs.

In the longitudinal bore 104 of the inner lip 94 and the cylinder 100, there is disposed a core 110. The core 110 is bolted to the cylinder 100 of the inner lip 94 and defines an annular space 104 with the inner lip 94 through which an inside bath of regenerating fluid can flow. The core 110 defines a threaded internal bore 114. Extending upward through the inner lip 94 is a mandrel 120 that is fed down through the aquarium 34 and threaded into the core's bore 114.

The mandrel 120 is disposed inside of the cellulosic casing 90 and defines an annular space therewith for containing an inside bath of regenerating liquid that is received from the annular space 104 defined by the core 110 and the inner lip 94. The inside bath then flows through a mandrel bore 126 and down into the internal bore 114 of the core 110.

Extending downwardly from the core 110 and threaded therein is a drain tube 134 for receiving the inside bath from the core 110. The drain tube 134 has suspended from it a weir trap 136 that receives inside bath fluid and vents it to the atmosphere through an open top. The relative elevation between the weir trap 136 and the drain tube 134 is adjustable using the trap set screw 138. In this manner, gases can be released from the open top of the trap, and liquid can overflow the trap to be recovered and reused. The weir depth is adjustable with the trap depth adjuster, so that backpressure of the gases can be regulated to keep the casing inflated to a proper diameter.

In view of the description above, it will be apparent that the casing extruder 20 is operated by feeding viscose through the viscose feed tube 22 and into the annular space defined by the die body 24 and the inner lip 94 and its associated cylinder 100. The viscose circulates through the annular space and upward toward the die opening 96 defined by the spacing of the inner lip 94 and the outer lip 38 to extrude a cylindrical casing 90 that is then regenerated with the outside bath stored in the aquarium 34 on its outer surface and on its inner surface by an inside bath.

Inside bath regenerating fluid is fed through the inside bath feed conduit 130 to the annular space 104 where it flows upward, into the casing, over a mandrel rim 124, and then downward through the mandrel bore 126. The inside bath regenerating fluid continues downward through the internal bore 114, drain tube 134, and into the weir trap 136.

To center the inner lip 94 relative to the outer lip 38, centering adjustment screws 40 are turned to move the die body 24, which in turn moves the inner lip 94, the cylinder 100, the core 110, and the mandrel 120. In this manner, there are no adjustment screws or spacers to interfere with viscose flow toward the die opening 96 and the means for centering the inner lip 94 relative to the outer lip 38 is completely external and unexposed to the inside bath, outside bath, and the viscose.

Further, with this arrangement it is possible to change the size and shape of the inner lip.94 by simply removing the mandrel 126 from above and the cylinder 100 from below by removing bolts 199. The cylinder 100, the inner lip 94, and the core 110 will drop from the casing extruder 20 and the inner lip 94 can be unscrewed from the cylinder 100. To change the outer lip 38, it is necessary to reach through access ports (not illustrated) in the aquarium 34 and unbolt the outer lip 38. This arrangement saves considerable change over time and effort and results in a less expensive casing extruder 20 because the finely machined inner lip 94 and outer lip 38 can be interchanged without replacing the other parts described above, as well as, keeping the centering adjustment screws 40 away from the harmful fluids inside the casing extruder 20.

Figure 4:
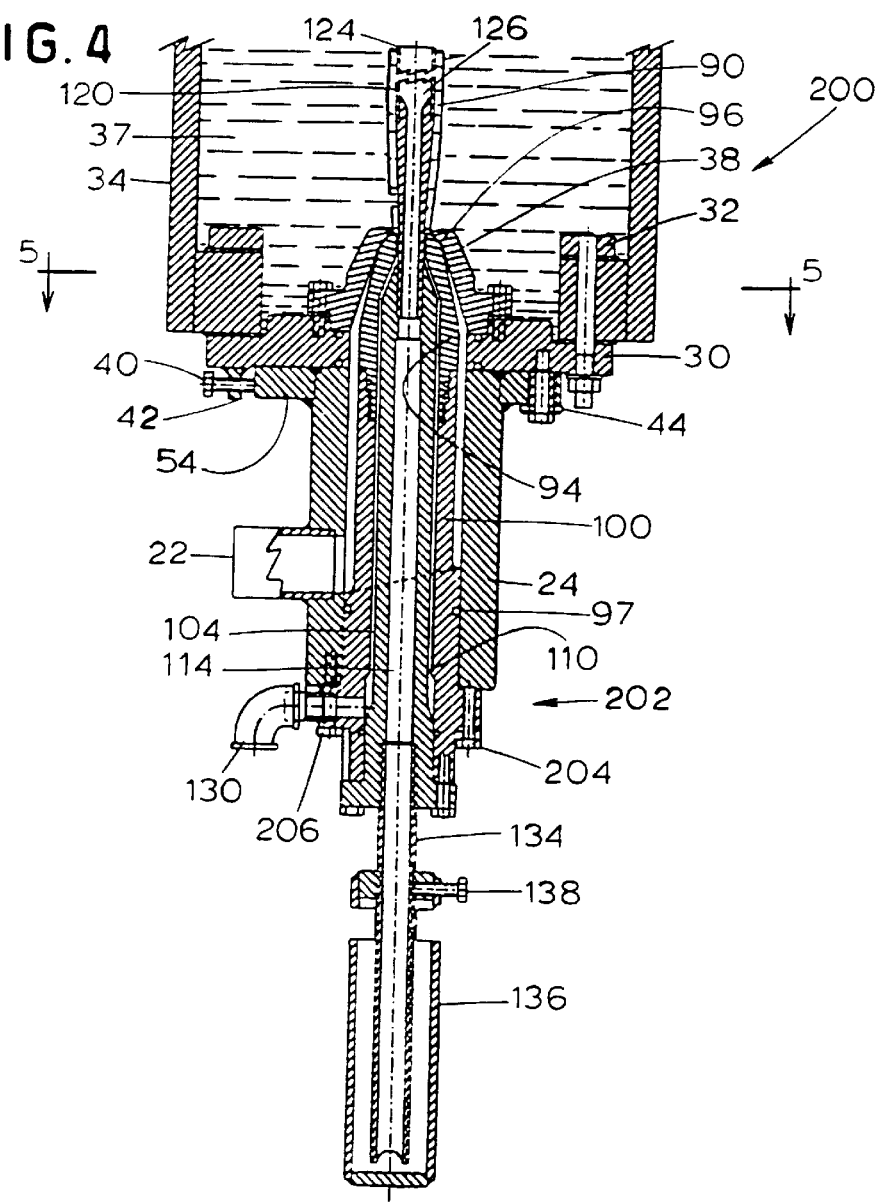
FIG. 4 is a cross-sectional view of an alternate embodiment of a tubular cellulosic casing die in accordance with the present invention.

Next, FIG. 4 illustrates a casing extruder 200 that includes many of the same elements as the casing extruder 20 in FIG. 1. As depicted, the casing extruder 200 includes a viscose feed tube 22, a die body 24, a carrier flange 30, a mounting ring 32, an aquarium 34, an outer lip 38, an inner lip 94, and means for centering the inner lip 94 relative to the outer lip 38.

The primary difference between the casing extruder 200 and the casing extruder 20 is that the inner lip 94 can be adjusted vertically using jacking means 202. Vertical movement of the inner lip 94 varies the annular size of the die opening 96 because the inner lip 94 and the outer lip 38 are conical and slope inward toward the die opening 96. Thus, raising the inner lip 94 reduces the annular size of the die opening 96 (resulting in a thinner casing wall) and lowering the inner lip 94 enlarges the annular size of the die opening 96 (resulting in a thicker casing wall). The jacking means 202 preferably includes a jacking screw 204 that is turned until the desired vertical spacing between the inner and outer lips is obtained. Once set, a tensioning screw 206 is tightened to load the jacking screw 204 and lock the vertical position of the inner lip 94. Optionally, a shim pack can be inserted between the die body 24 and the inner lip 94, and clamped in place by the bolts 199.

The jacking means 202 is preferably used in conjunction with the centering adjustment screws 40 for optimum control over the die opening 96 geometry. However, these two adjustment means can be used independently of one another where appropriate.

In light of the foregoing description, one of ordinary skill in the art would be capable of selecting specific die dimensions to accommodate various viscose properties and operating conditions. According to one set of conditions, utilizing viscose with a viscosity of about 30,000 centipoise and an extrusion speed of about 42 meters per minute, the die nozzle dimensions setout in Table 1 below are projected to be preferred for various casing sizes.

Minor adjustments to the die opening by moving the inner lip 94 will optimize casing uniformity and size. Further adjustments by one skilled in the art may be necessary depending upon viscose viscosity and down-stream conditions in the plant. Nevertheless, replacing lip sizes as described above can be done quickly to make large changes in the die opening.

TABLE 1

Recommended Extrusion Parameters

| Casing USA Size | Casing European Size | Nozzle ID (mm.) | Nozzle OD (mm.) | Nozzle gap thickness micron |
|---|---|---|---|---|
| 13 | 12 | 12.8 | 13.4 | 300 |
| 14 | 13 | 13.4 | 14.0 | 310 |
| 15 | 14 | 14.2 | 14.9 | 312 |
| 16 | 15 | 14.9 | 15.5 | 319 |
| 17 | 15.5 | 15.4 | 16.1 | 327 |
| 18 | 16 | 16.0 | 16.7 | 336 |
| 19 | 17 | 16.6 | 17.3 | 338 |
| 20 | 18 | 17.3 | 18.0 | 344 |
| 21 | 19 | 18.0 | 18.7 | 346 |
| 22 | 20 | 18.7 | 19.4 | 348 |
| 23 | 21 | 19.5 | 20.2 | 342 |
| 24 | 22 | 20.5 | 21.1 | 340 |
| 25 | 23 | 21.1 | 21.8 | 343 |
| 26 | 24 | 22.2 | 22.9 | 339 |
| 27 | 25 | 23.1 | 23.8 | 338 |
| 28 | 26 | 24.1 | 24.7 | 336 |
| 29 | 27 | 25.1 | 25.7 | 334 |
| 30 | 28 | 26.3 | 27.0 | 345 |
| 31 | 29 | 27.3 | 28.0 | 368 |
| 32 | 30 | 28.3 | 29.0 | 368 |
| 33 | 31 | 29.2 | 30.0 | 366 |
| 34 | 32 | 30.2 | 31.0 | 365 |
| 35 | 33 | 31.2 | 31.9 | 364 |
| 36 | 34 | 32.2 | 32.9 | 372 |

The foregoing detailed description is presented for clearness of understanding only and no unnecessary limitation therefrom should be read into the following claims.

We claim:

1. An adjustable tubular cellulosic casing die comprising:
   a carrier flange having mounting means for being fixed to an aquarium on a cellulosic tube casing machine;
   an outer lip fixed to the carrier flange and defining a central orifice;
   a die body adjustably mounted on the carrier flange and defining a bore therethrough for feeding viscose to the outer lip;
   an inner lip joined to the die body for adjustment therewith, and having an outer surface adjacent the outer lip orifice to define an annular die opening with the outer lip; and
   means for adjusting the die body relative to the carrier flange to thereby adjust the inner lip relative to the outer lip.

2. The adjustable tubular cellulosic casing die of claim 1 in which the means for adjusting the die body comprises:
   a bolt extending through an oversized hole in the die body and threaded into the carrier flange; and spring means retained adjacent the die body by a head of the bolt for applying resilient tension to the bolt;

thereby permitting lateral movement of the die body relative to the carrier flange.

3. The adjustable tubular cellulosic casing die of claim 1 in which the means for adjusting the die body relative to the carrier flange comprises:

a threaded centering adjustment tab fixed to the carrier flange; and a centering adjustment screw threaded into the fixed adjustment tab, and having an end for engaging the die body, thereby permitting lateral movement of the die body and its attached inner lip relative to the fixed carrier flange and its attached outer lip upon rotation of the screw.

4. The adjustable tubular cellulosic casing die of claim 1 in which:

the inner lip is joined to the die body with vertical adjusting means comprising:

jack screw for vertically moving the die body and the inner lip relative to the outer lip, and a tensioning screw for fixing the vertical position of the inner lip relative to the die body.

5. The adjustable tubular cellulosic casing die of claim 1, and further comprising:

a core disposed in a central bore of the inner lip and fixed to the inner lip for adjustment therewith; and a mandrel joined to the core and defining a central inside bath conduit.

6. The adjustable tubular cellulosic casing die of claim 5, and further comprising:

a drain tube in fluid communication with the central inside bath conduit of the mandrel.

7. The adjustable tubular cellulosic casing die of claim 6, and further comprising means for maintaining substantially constant pressure in the central inner bath conduit of the mandrel and substantially constant expansion of a tubular casing.

8. The adjustable tubular cellulosic casing die of claim 7, in which the means for maintaining substantially constant pressure in the central inner bath conduit of the mandrel comprises:

a weir trap vertically adjustably mounted to the drain tube.

9. An adjustable tubular cellulosic casing die comprising:

a carrier flange having mounting means for being fixed to an aquarium on a cellulosic tube casing manufacturing machine;

an outer lip releasably joined to the carrier flange and defining a central opening;

a die body mounted on the carrier flange and defining a bore therethrough for feeding viscose to the outer lip orifice;

an inner lip adjustably mounted within the die body bore and adjacent the outer lip orifice to define an annular die opening with the outer lip;

vertical adjustment means for vertically adjusting the inner lip relative to the die body to reconfigure the annular die opening and lateral adjustment means for laterally adjusting the die body relative to the carrier flange to center the inner lip relative to the outer lip.

10. The adjustable tubular cellulosic casing die of claim 9 in which the vertical adjustment means comprises:

a threaded jack tab fixed to the inner lip;

a vertical jacking screw threaded into the jack tab and having an end bearing on the die body; and means for locking the adjusted inner lip in place.

11. The adjustable tubular cellulosic casing die of claim 9 in which the lateral adjustment means comprises:

a bolt extending through an oversized hole in the die body and threaded into the carrier flange; and spring means retained adjacent the die body by a head of the bolt for applying resilient tension on the bolt and maintaining the die body and the carrier flange in a sliding relationship.

12. The adjustable tubular cellulosic casing die of claim 11 in which the lateral adjustment means for comprises:

a threaded centering adjustment tab fixed to the carrier flange; and a centering adjustment screw threaded into the fixed adjustment tab, and having an end for engaging the die body.

13. The adjustable tubular cellulosic casing die of claim 9, and further comprising:

a core disposed in a central bore of the inner lip and fixed to the inner lip for adjustment therewith; and a mandrel joined to the core and defining a central inside bath conduit.

14. The adjustable tubular cellulosic casing die of claim 13, and further comprising:

a drain tube in fluid communication with the central inside bath conduit of the mandrel.

15. The adjustable tubular cellulosic casing die of claim 14, and further comprising means for maintaining substantially constant pressure in the central inside bath conduit of the mandrel and substantially constant expansion of a tubular casing.

16. The adjustable tubular cellulosic casing die of claim 15, in which the means for maintaining substantially constant pressure in the central inside bath conduit of the mandrel comprises:

a weir trap vertically adjustably mounted to the drain tube.

17. A modular tubular cellulosic casing die comprising:

a carrier flange having means for being mounted to a cellulosic tube casing machine;

an outer lip removeably joined to the carrier flange, and defining a central orifice;

a die body removeably joined to the carrier flange, and defining a central bore;

an inner lip removably joined to the die body and disposed in the die body bore, the inner lip including an upper outer surface adjacent the central orifice of the outer lip to define an annular opening with the outer lip, and the inner lip defining a bore therethrough; and a core removably joined to the inner lip and disposed in the bore of the inner lip, the core having means for being joined to a mandrel.

18. The modular tubular cellulosic casing die of claim 17, and further comprising:

means for adjusting the die body to center the inner lip relative to the outer lip.

19. The modular tubular cellulosic casing die of claim 18 in which the means for adjusting the die body to center the inner lip relative to the outer lip comprises:

a bolt extending through an oversized hole in the die body and threaded into the carrier flange;

spring means retained adjacent the die body by a head of the bolt, for applying resilient tension to the bolt and maintaining the die body and the carrier flange in a sliding relationship; and means for sliding the die body relative to carrier flange.

20. The adjustable tubular cellulosic casing die of claim 19 in which the means for sliding the die body relative to the carrier flange comprises:

a threaded centering adjustment tab fixed to the carrier flange; and a centering adjustment screw threaded into the fixed adjustment tab, and having an end for engaging the die body.

21. The adjustable tubular cellulosic casing die of claim 17 in which:

the inner lip is joined to the die body with vertical adjusting means comprising;

jacking means for adjusting a vertical spacing between the inner lip and the outer lip, and tensioning screw means for fixing the inner lip relative to the die body after the vertical spacing has been adjusted by the jacking means.

22. The adjustable tubular cellulosic casing die of claim 17, and further comprising:

a core disposed in a central bore of the inner lip and fixed to the inner lip for adjustment therewith; and a mandrel joined to the core and defining a central inside bath conduit.

23. The adjustable tubular cellulosic casing die of claim 22, and further comprising:

a drain tube in fluid communication with the central inner bath conduit of the mandrel.

24. The adjustable tubular cellulosic casing die of claim 23, and further comprising means for maintaining substantially constant pressure in the central inner bath conduit of the mandrel and substantially constant expansion of a tubular casing.

25. The adjustable tubular cellulosic casing die of claim 24, in which the means for maintaining substantially constant pressure in the central inner bath conduit of the mandrel comprises:

a weir trap vertically adjustably mounted to the drain tube.

26. A modular die for a cellulosic casing manufacturing machine, said die comprising:

a carrier flange mounted to a regeneration bath container and having a central aperture and upper and lower surfaces;

an outer lip member removably attached to said carrier flange upper surface and having an orifice adjacent said aperture;

a die body mounted to said carrier flange lower surface, said die body having a bore;

a cylinder disposed within said die body bore, said cylinder having a bore and a removable inner lip, said inner lip having an outer surface defining with said outer lip orifice an annular extrusion opening;

a core removably disposed within said cylinder bore;

thereby permitting selective removal and replacement of either of said outer lip, said inner lip, said cylinder, and said bore without removal of said die body from the machine.

* * * * *

UNITED STATES PATENT AND TRADEMARK OFFICE
CERTIFICATE OF CORRECTION

PATENT NO. : 5,773,035
DATED : June 30, 1998
INVENTOR(S) : Alan D. Stall et al.

It is certified that error appears in the above-identified patent and that said Letters Patent is hereby corrected as shown below:

Col. 3, line 42: delete "Thelogical" and insert -- rheological --.

Col. 4, line 62: delete "n" and insert - -on- -.

Col. 6, line 3: delete "40".

Signed and Sealed this

Twenty-sixth Day of September, 2000

Attest:

Q. TODD DICKINSON

*Attesting Officer*          *Director of Patents and Trademarks*